US009225589B2

(12) United States Patent
Hui et al.

(10) Patent No.: US 9,225,589 B2
(45) Date of Patent: Dec. 29, 2015

(54) FAST REROUTE USING DIFFERENT FREQUENCY-HOPPING SCHEDULES

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 13/921,748

(22) Filed: Jun. 19, 2013

(65) Prior Publication Data

US 2014/0376361 A1 Dec. 25, 2014

(51) Int. Cl.
*H04L 12/24* (2006.01)
*H04B 1/715* (2011.01)
*H04W 40/12* (2009.01)

(52) U.S. Cl.
CPC ............ *H04L 41/0654* (2013.01); *H04B 1/715* (2013.01); *H04W 40/12* (2013.01)

(58) Field of Classification Search
None
See application file for complete search history.

(56) References Cited

U.S. PATENT DOCUMENTS

| 6,466,138 | B1 | 10/2002 | Partyka | |
|---|---|---|---|---|
| 6,690,657 | B1* | 2/2004 | Lau et al. | 370/315 |
| 2005/0047481 | A1* | 3/2005 | Lyle et al. | 375/132 |
| 2005/0058181 | A1* | 3/2005 | Lyle et al. | 375/133 |
| 2005/0159106 | A1* | 7/2005 | Palin et al. | 455/41.2 |
| 2006/0215581 | A1 | 9/2006 | Castagnoli | |
| 2009/0097531 | A1* | 4/2009 | Franceschini et al. | 375/133 |
| 2011/0103428 | A1* | 5/2011 | Chan | 375/133 |
| 2012/0155284 | A1 | 6/2012 | Shaffer et al. | |
| 2012/0155511 | A1* | 6/2012 | Shaffer et al. | 375/133 |
| 2012/0230370 | A1 | 9/2012 | Shaffer et al. | |
| 2013/0013806 | A1 | 1/2013 | Woo et al. | |
| 2013/0016757 | A1 | 1/2013 | Hui et al. | |
| 2013/0022084 | A1 | 1/2013 | Vasseur et al. | |
| 2013/0094536 | A1 | 4/2013 | Hui et al. | |
| 2013/0094537 | A1 | 4/2013 | Hui et al. | |
| 2013/0107804 | A1* | 5/2013 | Akisada et al. | 370/328 |
| 2013/0107909 | A1 | 5/2013 | Jones et al. | |

OTHER PUBLICATIONS

Bahl, et al., "SSCH: Slotted Seeded Channel Hopping for Capacity Imrpovement in IEEE 802.11 Ad-Hoc Wireless Networks", MobiCom '04, Sep. 26-Oct. 1, 2004, 15 pages, ACM, Philadephia, PA.
Biswas, et al., "Opportunistic Routing in Multi-Hop Wireless Networks", ACM SIGCOMM Computer Communications Review, vol. 34, No. 1, Jan. 2004, pp. 69-74, ACM, New York, NY.
Hou, et al., "Asynchronous Multi-Channel MAC Design with Difference Set Based Hopping Sequences", Engine, Aug. 2009, 9 pages, downloaded: engine.lib.uwaterloo,ca on Jun. 17, 2013, Waterloo University, Canada.
Winter, et al., "RPL: IPv6 Routing Protocol for Low-Power and Lossy Networks", Request for Comments 6550, Mar. 2012, 157 pages, Internet Engineering Task Force Trust.
Zubow, et al., "Multi-Channel Opportunistic Routing in Multi-Hop Wireless Networks", Humboldt University Berlin, 2006, 20 pages, Berlin, Germany.
International Search Report mailed Nov. 20, 2014 in connection with PCT/US2014/043287.

\* cited by examiner

*Primary Examiner* — Brian Roberts
(74) *Attorney, Agent, or Firm* — Parker Ibrahim & Berg LLC; James M. Behmke; Stephen D. LeBarron

(57) ABSTRACT

In one embodiment, a primary node in a shared-media communication network is selected by a node toward a destination. In response to determining the primary node, the node determines a frequency-hopping schedule of the primary node. One or more backup nodes for the primary nodes are then determined based on a frequency-hopping schedule diversity between the primary node and the one or more backup nodes.

24 Claims, 7 Drawing Sheets

FAST REROUTE USING DIFFERENT FREQUENCY-HOPPING SCHEDULES

TECHNICAL FIELD

The present disclosure relates generally to computer networks, and, more particularly, to fast reroute using different frequency-hopping schedules.

BACKGROUND

Mesh networks are composed of two or more electronic devices, each containing at least one transceiver. The electronic devices use their transceivers to communicate with one another and/or a central device. If a device wishes to communicate with another device that is out of transmission range, the device may communicate via multi-hop communication through other devices. In a frequency-hopping (or channel-hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time.

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. Generally, existing systems perform clear channel assessments for network transmissions toward a destination, such that in response to detecting a busy channel during the assessment, the devices in the system can set a backoff timer and attempt the transmission at a later time, thus avoiding collisions with neighboring transmissions. Moreover, certain systems are also configured to decrease network latency that occurs due to retransmissions by maintaining alternate next-hop routes for use when a primary route is unavailable.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
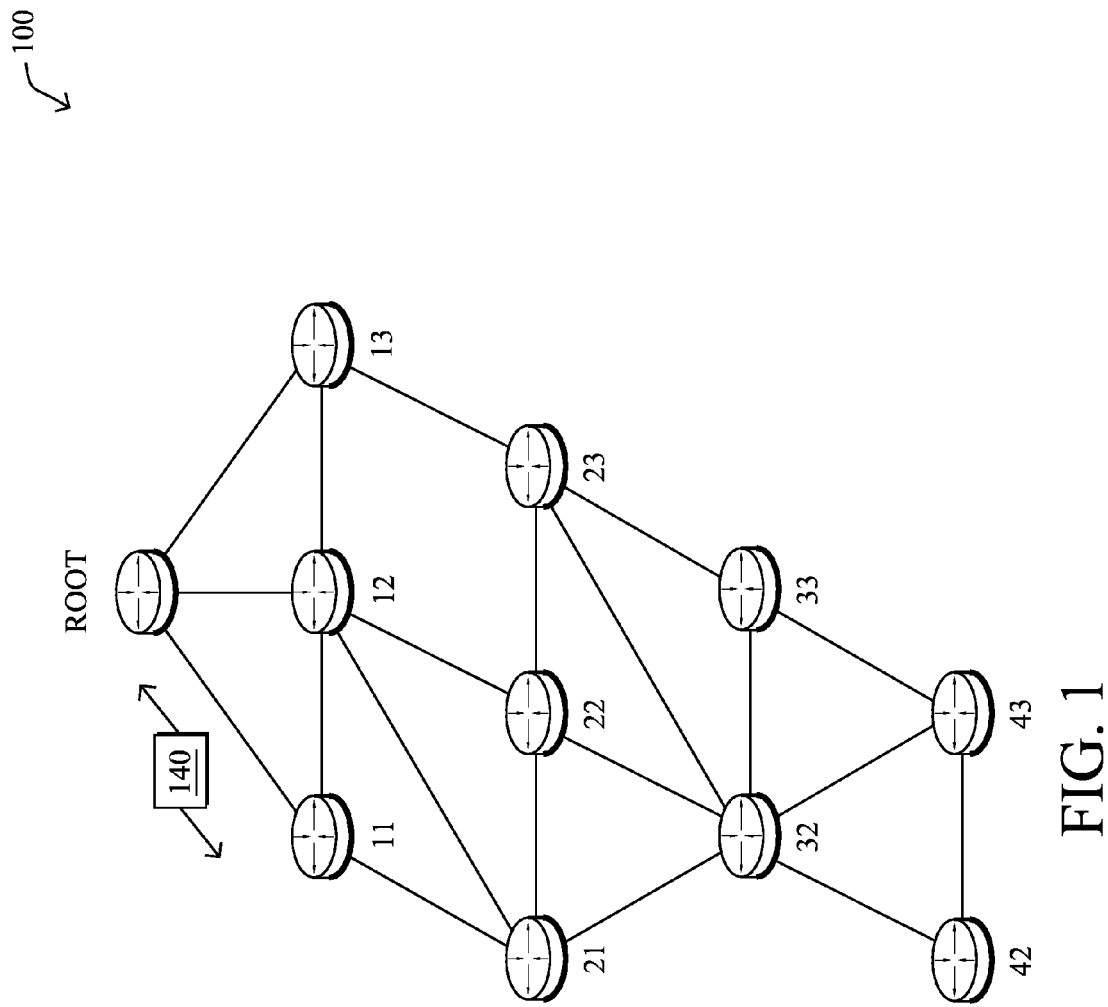
FIG. 1 illustrates an example communication network.
Figure 1:
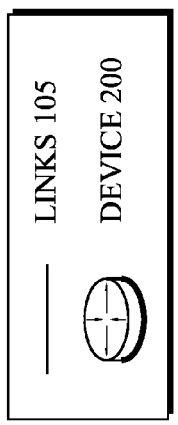

According to one or more embodiments of the disclosure, a node may select a primary node in a shared-media communication network toward a destination and may determine a frequency-hopping schedule of the primary node. The node may then determine one or more backup nodes for the primary node based on a frequency-hopping schedule diversity between the primary node and the one or more backup nodes.

According to one or more additional embodiments of the disclosure, a node may select a primary node in a shared-media communication network toward a destination. The node may then determine one or more backup nodes for the primary node. In response to determining the one or more backup nodes, the node may determine a frequency-hopping schedule of each back up node. In particular, each frequency-hopping schedule has a least degree of overlap from the primary node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs); neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
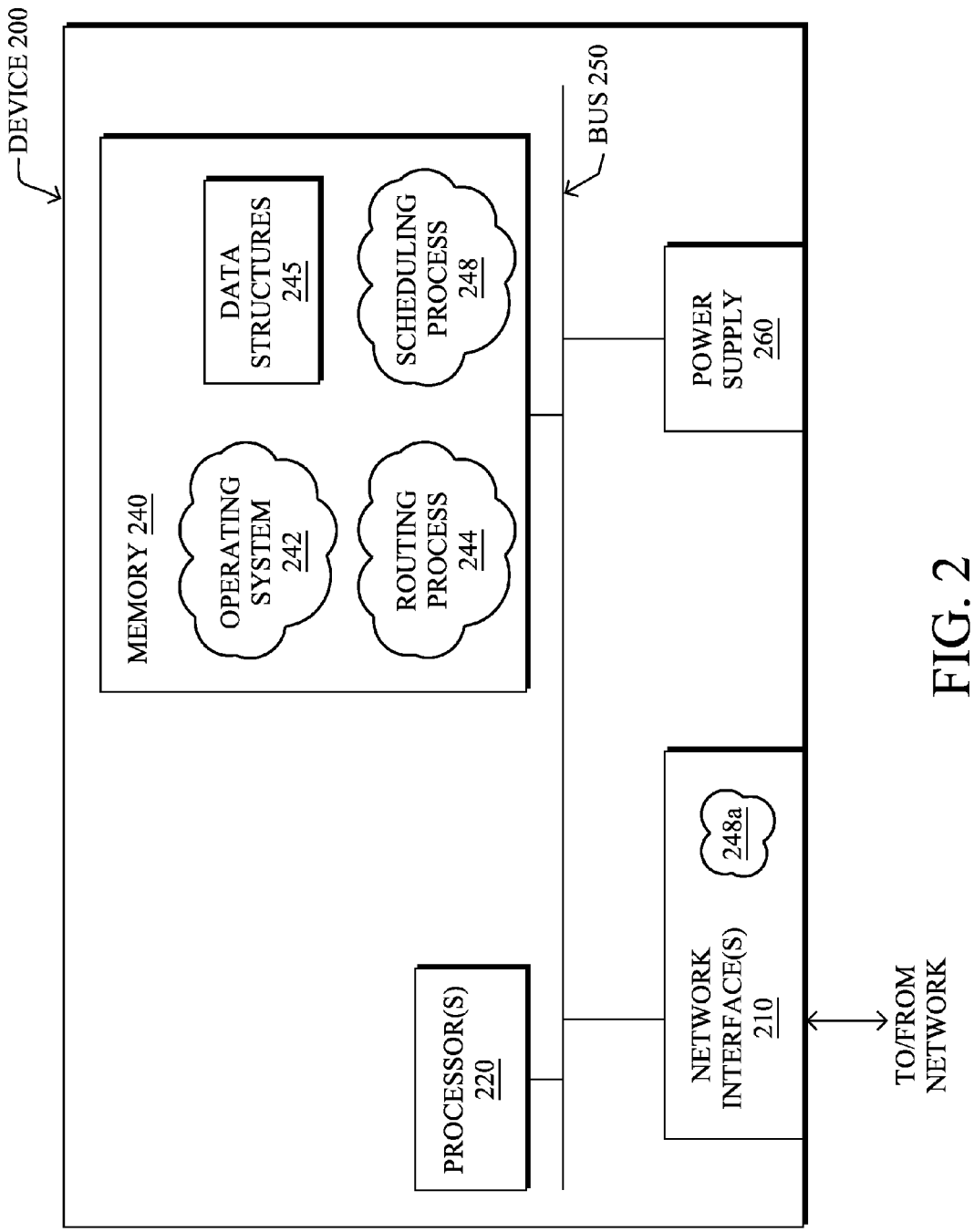
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and a scheduling process 248, as described herein. Note that while the scheduling process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
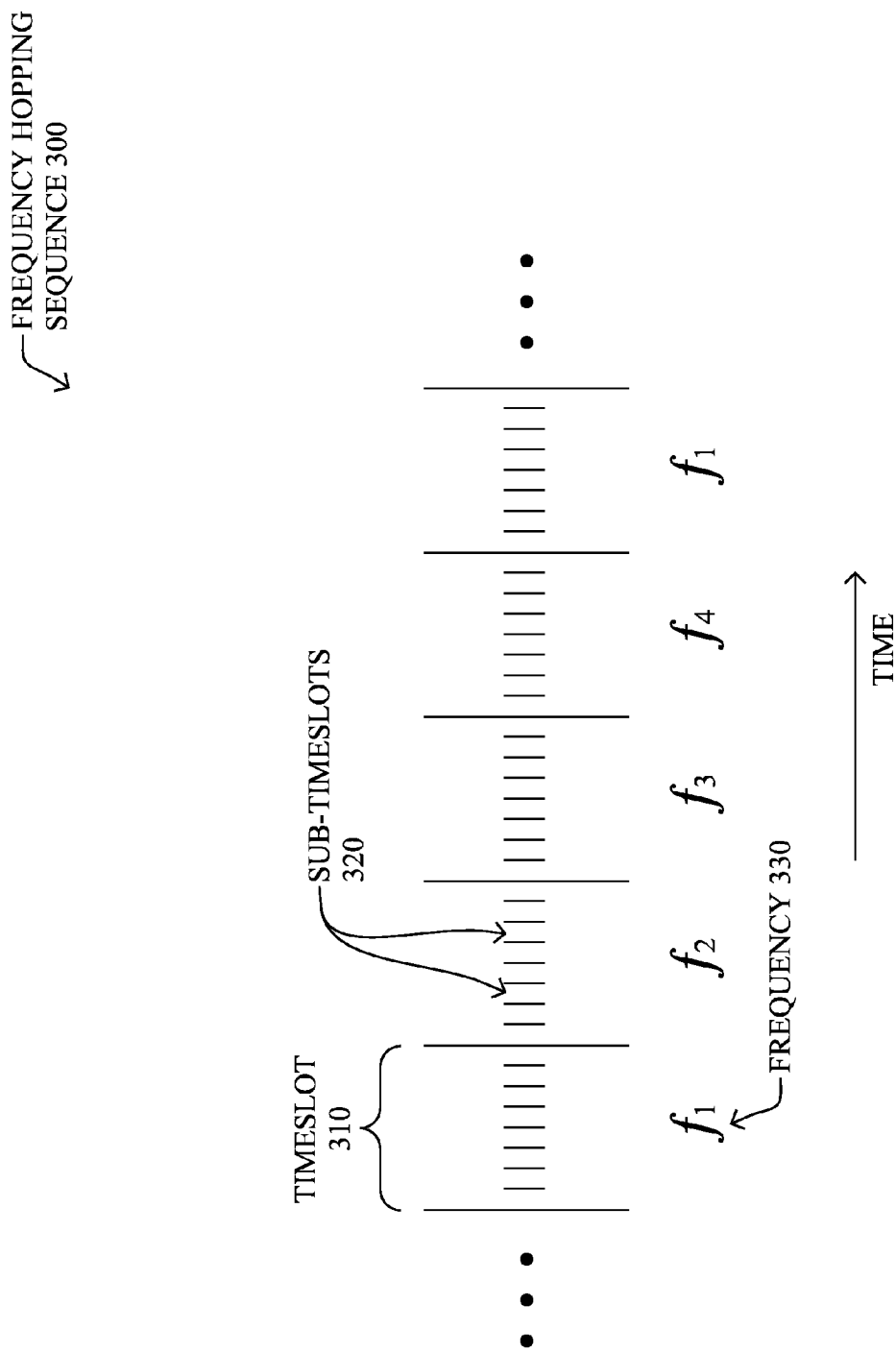
FIG. 3 illustrates an example frequency-hopping sequence.

In general, as shown in FIG. 3, in frequency-hopping wireless networks, time frames are divided within a frequency-hopping sequence (e.g., schedule) 300 into regular timeslots 310, each one operating on a different frequency 330 (e.g., $f_1$-$f_4$). A reference clock may be provided for the time frames for an entire network (e.g., mesh/cell), or at least between pairs of communicating devices. A MAC layer of each node 200 divides time into timeslots that are aligned with the timeslot boundary of its neighbor. Also, each timeslot 310 may be further divided into sub-timeslots 320. (Note that not all frequency-hopping systems use sub-timeslots, and devices may begin transmission at any time within a timeslot; the view herein is merely one example.) Illustratively, the MAC layer is in charge of scheduling the timeslot in which a packet is sent, the main objective of which generally being randomization of the transmission time in order to avoid collisions with neighbors' packets. Note that the MAC layer must not only schedule the data messages coming from upper layers of a protocol stack, but it also must schedule its own packets (e.g., acknowledgements, requests, beacons, etc.).

Figure 4:
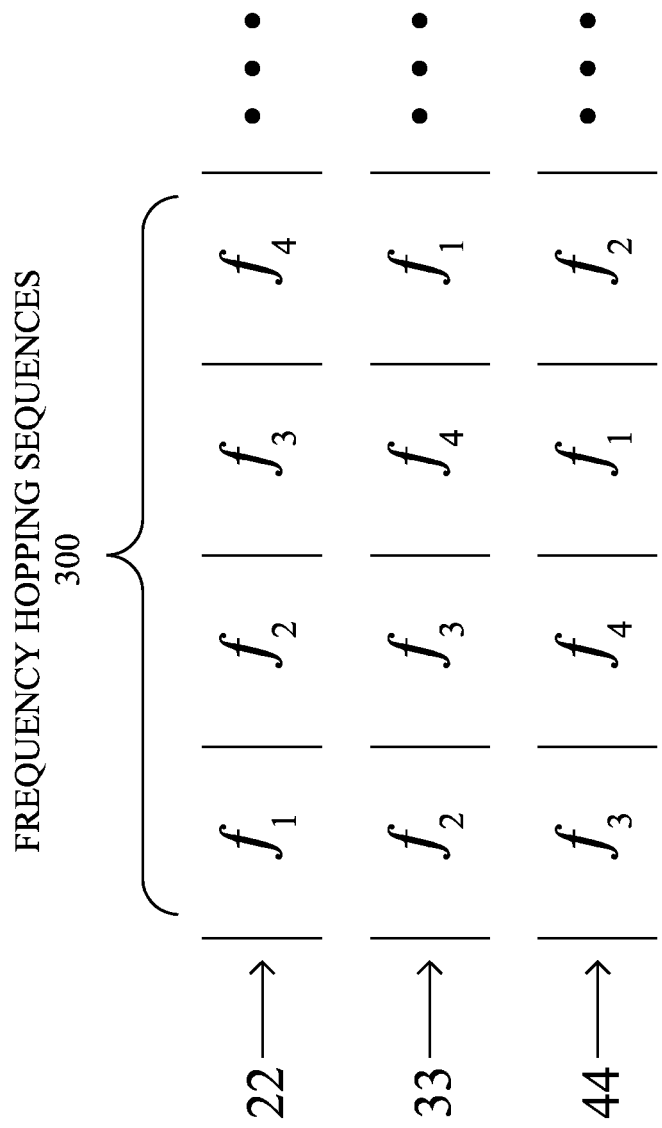
FIG. 4 illustrates another example of frequency-hopping sequences.

A device in the frequency-hopping network configures its receiver to follow a hopping schedule by picking a channel sequence, duration of each timeslot, and time base that defines when the first slot in the schedule begins. Each transmitter-receiver pair may utilize different hopping schedules (i.e., each pair may differ in channel sequence, time slot duration, and/or time base), such that transmitter-receiver pairs may communicate at the same time but on different channels. For instance, each device in the frequency-hopping network may individually pick hopping schedule parameters independent of any other node, as is shown in FIG. 4. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As further noted above, to reduce network latency and avoid transmission collisions, alternate next-hop routes are generally maintained by devices in a shared-media communication network. The devices typically set a backoff timer when a busy channel is detected and reattempt the transmission when the timer expires, thus preventing transmission collisions. Although, these known methods provide alternate next-hop routes, network latency still occurs due to the delay between transmissions during the backoff period (e.g. while waiting for the timer to expire).

Fast Re-Route using Different Frequency Schedules

The techniques herein provide a method for fast reroute using alternate next-hop routes that operate on different frequency-hopping schedules. For instance, when a node detects a busy channel, the node may either backoff and attempt the transmission over the same next-hop route at a later time or may choose an alternate next-hop route and attempt the transmission over a different frequency channel corresponding to the alternate next-hop route. Alternatively, based on delay characteristics, the node may transmit over the alternate next-hop route on a different frequency schedule and the primary next-hop route simultaneously. When searching for an alternate next-hop route, the node may consider various factors such as spectral diversity to choose a frequency-hopping schedule that has a least degree of overlap.

Specifically, according to one or more embodiments of the disclosure as described in detail below, a node may select a primary node in a shared-media communication network toward a destination and may determine a frequency-hopping schedule of the primary node. The node may then determine one or more backup nodes for the primary node based on a frequency-hopping schedule diversity between the primary node and the one or more backup nodes. Furthermore, according to one or more additional embodiments of the disclosure, a node may select a primary node in a shared-media communication network toward a destination. The node may then determine one or more backup nodes for the primary node. In response to determining the one or more backup nodes, the node may determine a frequency-hopping schedule of each back up node. In particular, each frequency-hopping schedule has a least degree of overlap from the primary node.

Illustratively, the techniques described herein may be performed by hardware, software, and/or firmware, such as in accordance with the scheduling process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various routing protocols, and as such, may be processed by similar components understood in the art that execute those protocols, accordingly.

Operationally, the techniques herein involve determining a frequency-hopping schedule of a selected primary node and utilizing alternate next-hop routes for fast rerouting based on a frequency-hopping schedule diversity between the primary node and determined backup nodes of the alternate next-hop routes. As a result, a node may immediately transmit over a backup node operating on a different frequency-hopping schedule than the primary node to minimize routing delays. Thus, the node may react to failed transmissions or detection of busy channels by either transmitting immediately over the backup nodes or transmitting over the primary node after a predetermined period of time has elapsed, based on various factors such as spectral diversity and delay characteristics.

Figure 5:
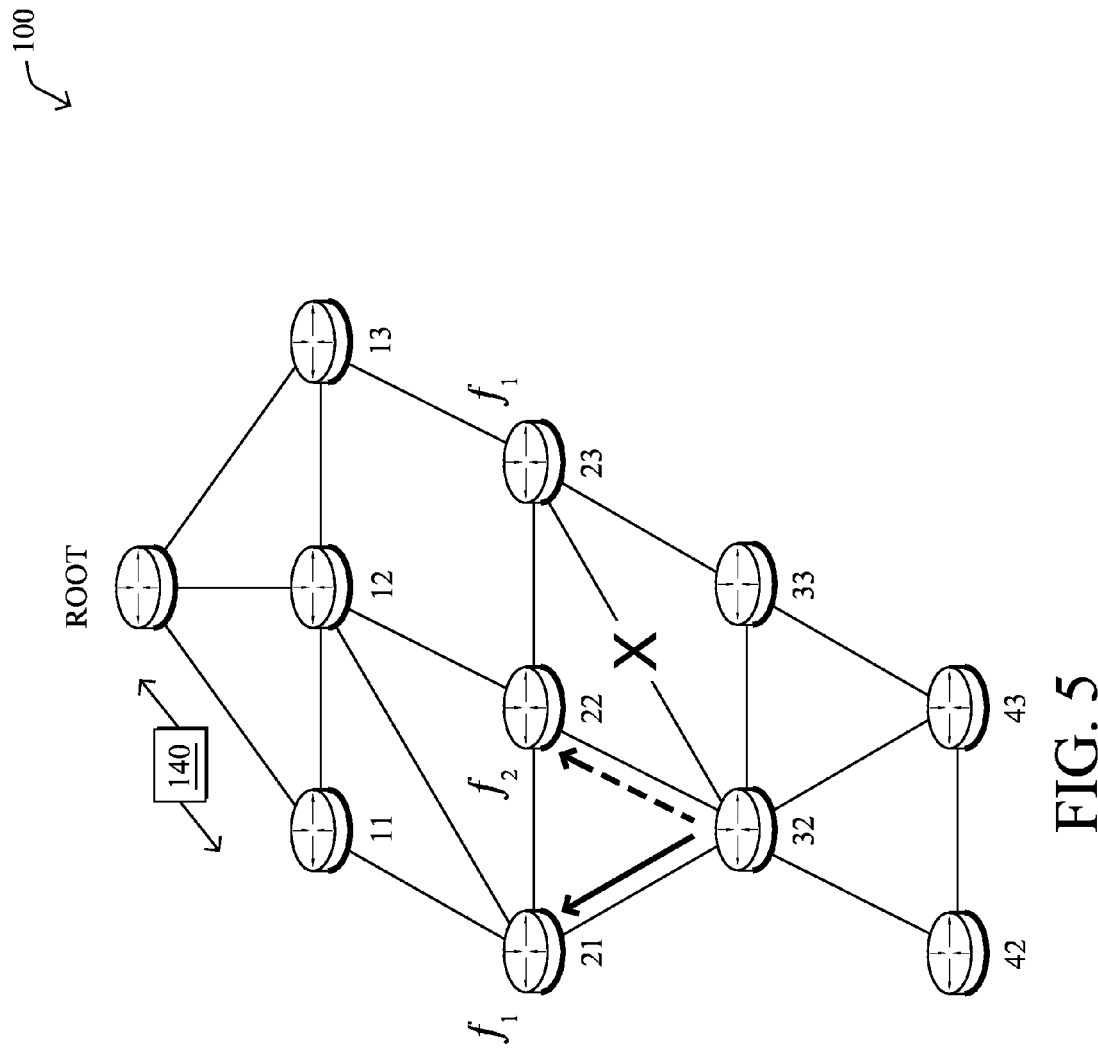
FIG. 5 illustrates an example selection of a backup route based on determined frequency-hopping sequence.
Figure 5:
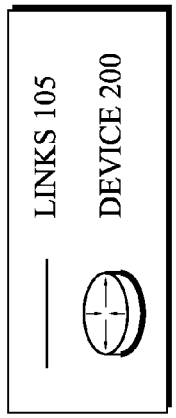

In one embodiment, as illustrated within FIG. 5, a node generally maintains next-hop routes toward the same destination based on frequency (e.g., channel) hopping schedules. Specifically, a primary node may be selected toward a destination and a frequency-hopping schedule of that primary node may be determined. Then, the node may determine a plurality of backup nodes for that primary node. To maximize the diversity between the frequency-hopping schedules, the backup nodes may be determined based on a least degree of overlap in the frequency-hopping schedules from the primary node. The differences in the overlap of the frequency-hopping schedules may be attributed to notches in the schedules of the backup nodes.

For instance, nodes may avoid frequencies that are determined to have higher levels of noise (e.g., busier frequencies) and may therefore; notch that frequency from the frequency-hopping schedule. Notably, the backup nodes may also be determined based on spectral diversity in the frequency-hopping schedules from the primary node, wherein the distance of the backup node in the frequency spectrum is taken in consideration. The spectral diversity may be used in determining the backup nodes to avoid interference in the transmission. By determining backup nodes that are listening on a different frequency, each node in a network may avoid internal and/or external interferences that could cause transmission failure.

Furthermore, as shown in FIG. 5, when attempting a transmission of a message, the node (32) may determine whether the primary node (21) is reachable. The reachability of the primary node may be based on various factors such as clear channel assessment, transmission failure, link quality, or the like. In response to determining unreachability (as shown by an "x" in FIG. 5) of the primary node during a given timeslot (as shown in FIG. 3), the transmission may be attempted toward the backup nodes (22 and 23) during that given timeslot, thus reducing any delay in the transmission. In other words, when the frequency of the primary node (21) is busy, the node may determine to immediately transmit over another frequency corresponding to a backup node (22 instead of 23). If the frequency of the chosen backup node is also determined to be busy, thus making the chosen backup node unreachable, the node may continue to attempt transmissions to the other predetermined backup nodes. In other words, the attempt itself may fail due to a clear channel assessment, a link quality, or a transmission failure and thus other backup nodes may be used for the transmission of the message.

When the given timeslot has passed to a subsequent timeslot (as shown in FIG. 3), and the transmission of the message to the backup node has not been successful, the node may reattempt to transmit the message to the primary node during the subsequent timeslot. For instance, the primary node may listen to a different frequency during the subsequent timeslot which may not be busy and thus, the node may attempt to transmit to the primary node again once reachability has been determined.

In another embodiment, once the node has determined one or more backup nodes and unreachability of a primary node for a message during a given timeslot of the frequency-hopping schedule, the node may determine whether to transmit to one of the backup nodes or whether to reattempt transmission to the primary node after a backoff period. When both the primary node and the backup node have substantially similar path characteristics, the node may transmit the message based on the path that causes a least amount of communication delay and variance in the delay. However, when the path characteristics vary, the node may determine whether to transmit to the primary node or one of the backup nodes based on a delay associated with reaching the destination by using the backup node. Therefore, network delays may be reduced since each node in the shared-media communication network may independently choose whether to transmit to a primary node or a backup node.

Figure 6:
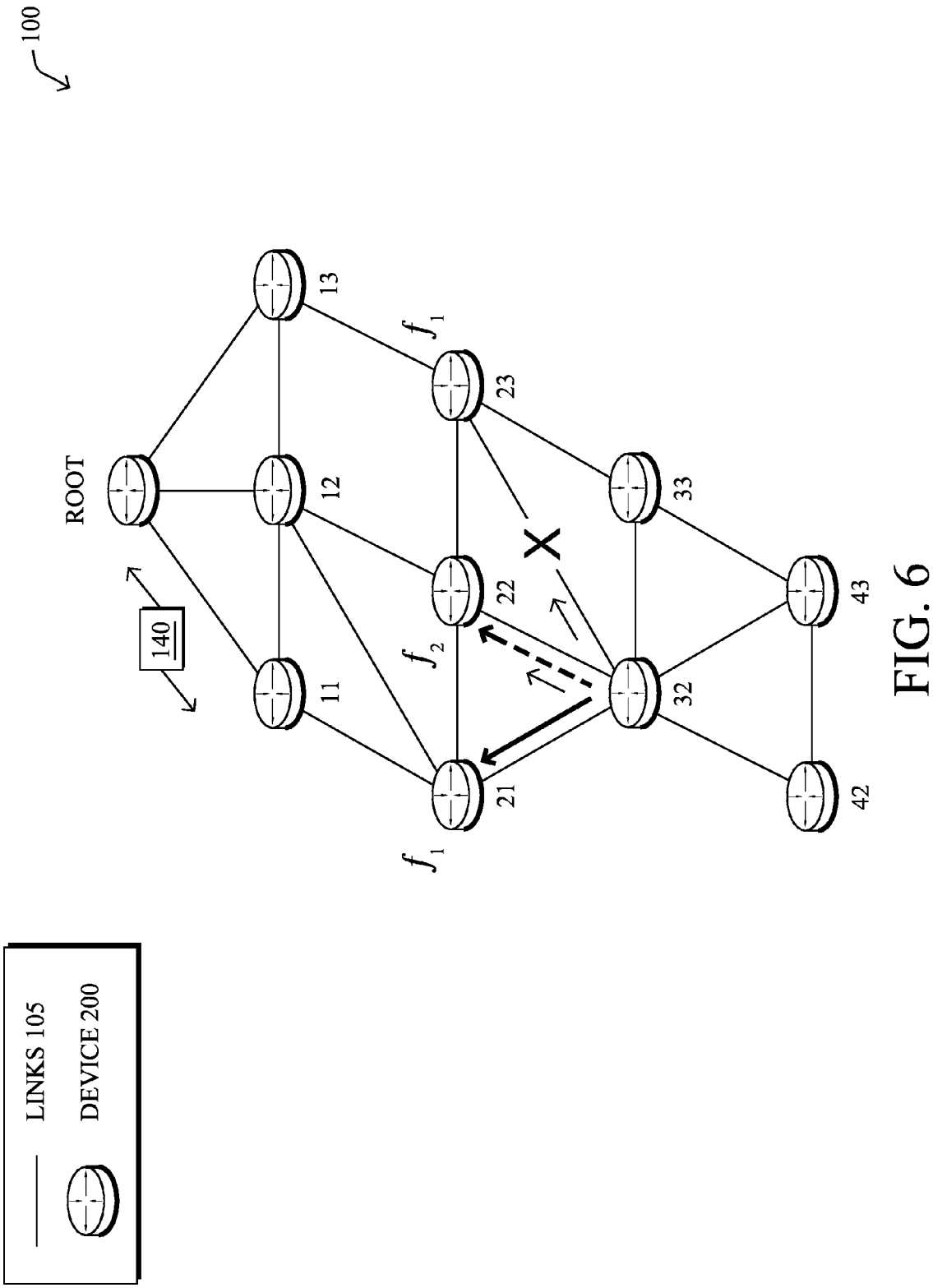
FIG. 6 illustrates an example selection of both the backup route of FIG. 5 and a primary route.

In yet another embodiment, as illustrated in FIG. 6, once the node (32) has determined one or more backup nodes (21 and 22), the node may attempt to transmit the message to both a backup node (22) and reattempt to transmit the message to the primary node (23) after a backoff period, simultaneously. In other words, although the node may determine that the primary node (23) is currently unreachable (as shown by the "x" in FIG. 6), the node may transmit the message to the backup node (22) on a different frequency than the primary node and transmit the same message (e.g., a duplicate) to the primary node (23) after backoff period to increase the delivery success of the message reaching the destination. The receiving node of that message may determine and eliminate a duplicate message. Accordingly, since each node in the shared-media communication network independently determines reachability of a next-hop node, transmitting to both the backup node and the primary node may reduce delays in the message reaching the destination (e.g., increase success of the message delivery to the destination).

The attempt and reattempt of transmitting the message to the backup node and the primary node may be based on various factors such as delay requirements, link quality, message type, message priority, and the like. For instance, in considering a message type, the node may attempt to transmit a critical type of message to the backup node while reserving non-critical type messages for transmission to the primary node after a backoff period. Thus, the node may attempt to reduce the delay of the critical messages reaching the destination. As another example, when the node detects that the link quality (e.g., expected transmissions) is below a predetermined threshold, the node may determine to transmit the message to both one of the backup nodes and the primary node after a backoff period to increase the message delivery rate.

In yet another embodiment, a node in a shared-media communication network may select a primary node toward a destination and may then determine one or more backup nodes for the primary node prior to determining a frequency-hopping schedule of the primary node. Then, in response to determining the backup nodes, the node may determine a frequency-hopping schedule of each backup node, wherein each frequency-hopping schedule has a least degree of overlap from the primary node. Once the frequency-hopping schedules have been determined and the node determines unreachability of the primary node for a message during a given timeslot of the schedule, the node may, as described in previous embodiments, transmit the message to one or more of the backup nodes during the given timeslot.

Figure 7:
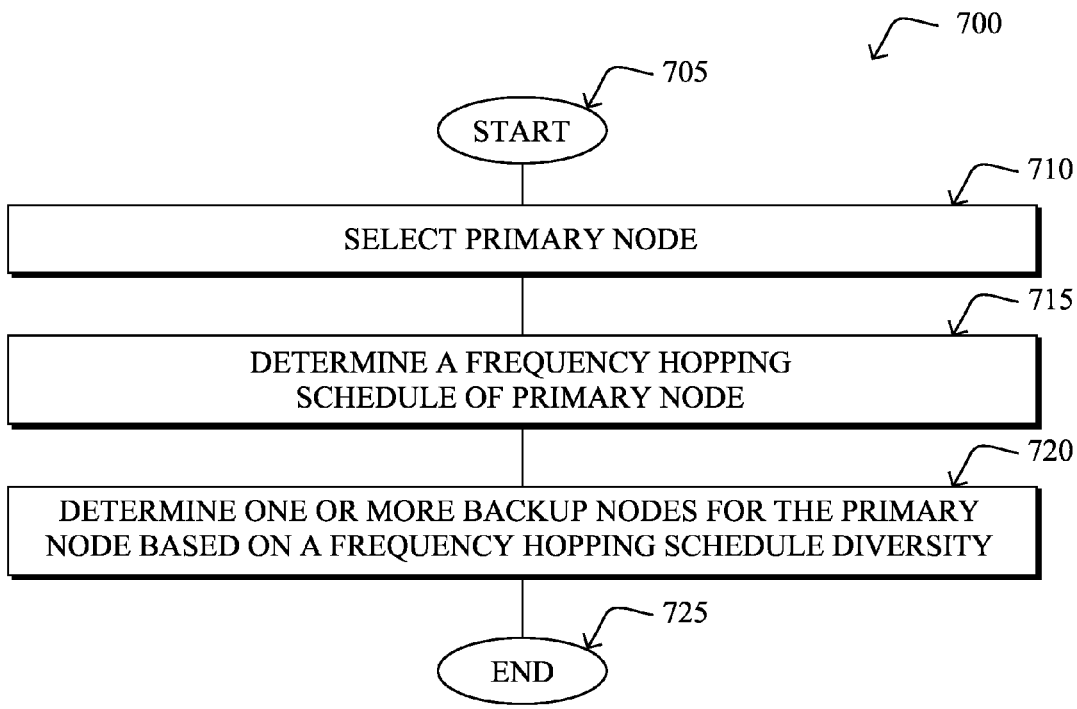
FIGS. 7-8 illustrate example simplified procedures for determining backup nodes based on frequency-hopping sequences.

FIG. 7 illustrates an example simplified procedure 700 for determining backup nodes in a shared-media communication network in accordance with one or more embodiments described herein. The procedure 700 may start at step 705, and continues to step 710, where, as described in greater detail above, a primary node in the shared-media communication network is selected toward a destination. In step 715, a frequency-hopping schedule of the primary node is determined. Furthermore, in step 720, one or more backup nodes for the primary node may be determined based on a frequency-hopping schedule diversity between the primary node and the one or more backup node. The procedure may then illustratively end in step 725.

Figure 8:
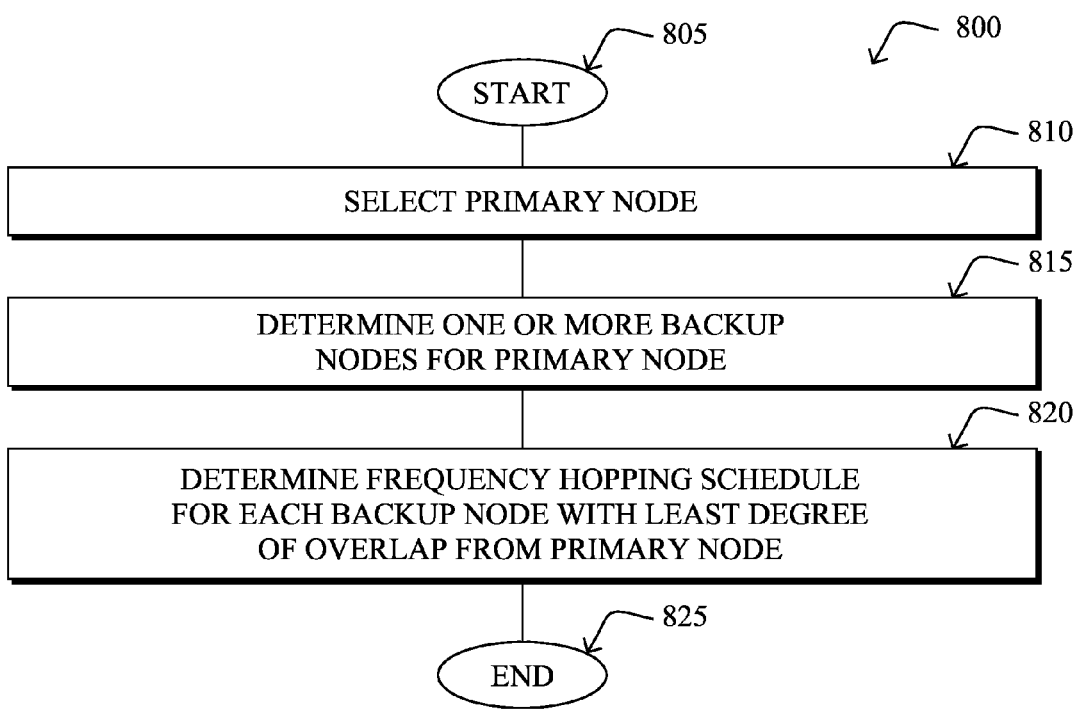

In addition, FIG. 8 illustrates another example simplified procedure 800 for determining backup nodes in a shared-media communication network in accordance with one or more embodiments described herein. The procedure 800 may start at step 805, and continues to step 810, where, as described in greater detail above, a primary node is selected toward a destination and in step 815, one or more backup nodes for the primary node may be selected. Furthermore, in step 820, a frequency-hopping schedule of each backup node may be determined in response to determining the one or more backup nodes. Specifically, in step 820, each frequency-hopping schedule of the one or more backup nodes may have a least degree of overlap from the primary node. The procedure 800 may then illustratively end in step 825.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for fast reroute using frequency-hopping schedule diversity in a shared-media communication network. In particular, the techniques herein dynamically select a primary node toward a destination and determine the frequency-hopping schedule of that primary node. The techniques herein then select backup nodes for the primary node based on frequency-hopping schedule diversity to decrease the network latency and avoid transmission collisions without the need to wait for availability of a primary route. Specifically, each device in the shared-media communication network may detect an alternate device on a different frequency, as opposed to known techniques where a set of receivers determine an alternate device from amongst those receivers, thus requiring the alternate devices to select a subset of receivers for transmissions.

Although known techniques of fast reroute maintain next-hop routes preventing the need for devices to actively discover alternate routes, thus improving reliability, the present disclosure further improves latency by providing alternate next-hop routes when a busy channel is detected. In other words, the techniques herein provide an immediately available alternate next-hop route to a different device on a different frequency-hopping schedule to further improve network latency problems. The present disclosure, unlike the known techniques such as time synchronized mesh protocol (TSMP), allows for scheduling next-hop receivers to listen on different frequencies simultaneously.

Furthermore, in contrast to current techniques where alternate paths are built to route around a link and/or node failure, the techniques herein provide for the option of fast rerouting to next-hop routes operating on a different frequency-hopping schedule to reduce the delay in the message reaching a destination.

While there have been shown and described illustrative embodiments that provide for fast reroute using different frequency channels in a shared-media communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of shared-media networks and/or protocols that operation according to frequency-hopping (or channel-hopping) schedules. In addition, while certain protocols are shown, such as RPL, other suitable protocols may be used, accordingly.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   selecting, by a particular node in a shared-media communication network, a primary node in the shared-media communication network toward a destination;
   determining a frequency-hopping schedule of the primary node; and
   determining one or more backup nodes for the primary node, based on a frequency-hopping schedule diversity between the primary node and the one or more backup nodes.

2. The method of claim 1, wherein determining the one or more backup nodes further comprises:
   selecting the one or more backup nodes that have a least degree of overlap in frequency-hopping schedules from the primary node.

3. The method of claim 1, wherein determining the one or more backup nodes further comprises:
   selecting the one or more backup nodes based on spectral diversity in frequency-hopping schedules from the primary node.

4. The method of claim 1, further comprising:
   determining unreachability of the primary node for a message during a given timeslot of the frequency-hopping schedule; and
   in response to determining unreachability of the primary node, attempting to transmit the message to the one or more backup nodes during the given timeslot.

5. The method of claim 4, wherein determining unreachability of the primary node is based on a clear channel assessment, a transmission failure, or link quality.

6. The method of claim 4, wherein the attempt is based on a clear channel assessment, a transmission failure, or link quality.

7. The method of claim 4, further comprising:
in response to passing of the given timeslot to a subsequent timeslot without a successful transmission of the message to a backup node, attempting to transmit the message to the primary node during the subsequent timeslot.

8. The method of claim 1, further comprising:
determining unreachability of the primary node for a message during a given timeslot of the frequency-hopping schedule; and
determining whether to attempt to transmit the message to the one or more backup nodes or reattempt to transmit the message to the primary node during the given timeslot after a backoff period.

9. The method of claim 8, wherein determining whether to attempt to transmit the message to the one or more backup nodes or to reattempt to transmit the message to the primary node is based on a delay associated with reaching the destination by using the one or more backup nodes.

10. The method of claim 8, further comprising:
attempting to transmit the message to the backup node and reattempting to transmit the message to the primary node after a backoff period simultaneously.

11. The method of claim 10, wherein the attempt and reattempt is based on at least one of: a delay requirement, link quality, message type, and message priority.

12. The method of claim 8, further comprising:
attempting to transmit critical type of messages to the backup node; and
reattempting to transmit non-critical type of message to the primary node after a backoff period.

13. A method, comprising:
selecting, by a particular node in a shared-media communication network, a primary node in the shared-media communication network toward a destination;
determining one or more backup nodes for the primary node; and
in response to determining the one or more backup nodes, determining a frequency-hopping schedule of each backup node, wherein each frequency-hopping schedule has a least degree of overlap with a frequency-hopping schedule of the primary node.

14. The method of claim 13, further comprising:
determining unreachability of the primary node for a message during a given timeslot of the frequency-hopping schedule; and
in response to determining unreachability of the primary node, attempting to transmit the message to the one or more backup nodes during the given timeslot.

15. The method of claim 13, further comprising:
determining unreachability of the primary node for a message during a given timeslot of the frequency-hopping schedule; and
determining whether to attempt to transmit the message to the one or more backup nodes or reattempt to transmit the message to the primary node during the given timeslot after a backoff period.

16. The method of claim 15, wherein determining whether to attempt to transmit the message to the one or more backup nodes or to reattempt to transmit the message to the primary node is based on a delay associated with reaching the destination by using the one or more backup nodes.

17. The method of claim 15, further comprising:
attempting to transmit the message to the backup node and reattempting to the message to the primary node after a backoff period simultaneously.

18. An apparatus, comprising:
one or more network interfaces to communication with a shared-media communication network;
a processor coupled to the network interfaces and adapted to execute one or more processes; and
a memory configured to store a process executable by the processor, the process when executed operable to:
select a primary node in a shared-media communication network toward a destination;
determine a frequency-hopping schedule of the primary node; and
determine one or more backup nodes for the primary node, based on a frequency-hopping schedule diversity between the primary node and the one or more backup nodes.

19. The apparatus of claim 18, wherein the process when executed is further operable to:
select the one or more backup nodes that have a least degree of overlap in frequency-hopping schedules from the primary node.

20. The apparatus of claim 18, wherein the process when executed is further operable to:
determine unreachability of the primary node for a message during a given timeslot of the frequency-hopping schedule; and
attempt to transmit the message to the one or more backup nodes during the given timeslot, in response to determining unreachability of the primary node.

21. The apparatus of claim 18, wherein the process when executed is further operable:
determine unreachability of the primary node for a message during a given timeslot of the frequency-hopping schedule; and
determine whether to attempt to transmit the message to the one or more backup nodes or reattempt to transmit the message to the primary node during the given timeslot after a backoff period.

22. An apparatus, comprising:
one or more network interfaces to communication with a shared-media communication network;
a processor coupled to the network interfaces and adapted to execute one or more processes; and
a memory configured to store a process executable by the processor, the process when executed operable to:
select a primary node in a shared-media communication network toward a destination;
determine one or more backup nodes for the primary node; and
determine a frequency-hopping schedule of each backup node, in response to determining the one or more backup nodes, wherein each frequency-hopping schedule has a least degree of overlap with a frequency-hopping schedule of the primary node.

23. The apparatus of claim 22, wherein the process when executed is further operable to:
determine unreachability of the primary node for a message during a given timeslot of the frequency-hopping schedule; and
attempt to transmit the message to the one or more backup nodes during the given timeslot, in response to determining unreachability of the primary node.

24. A non-transitory computer readable medium containing program instructions executed by a processor or controller, the computer readable medium comprising:
- program instructions that select a primary node in a shared-media communication network toward a destination;
- program instructions that determine a frequency-hopping schedule of the primary node; and
- program instructions that determine one or more backup nodes for the primary node, based on a frequency-hopping schedule diversity between the primary node and the one or more backup nodes.

* * * * *